(12) United States Patent
Shidore et al.

(10) Patent No.: US 11,235,662 B1
(45) Date of Patent: Feb. 1, 2022

(54) ELECTRICALLY PROPELLED VEHICLE GEARBOX HAVING A POWER TAKE-OFF

(71) Applicant: GM Global Technology Operations LLC, Detroit, MI (US)

(72) Inventors: Neeraj S. Shidore, Novi, MI (US); Madhusudan Raghavan, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/086,980

(22) Filed: Nov. 2, 2020

(51) Int. Cl.
| | |
|---|---|
| F16H 3/62 | (2006.01) |
| B60K 17/08 | (2006.01) |
| B60K 17/28 | (2006.01) |
| F16H 3/46 | (2006.01) |

(52) U.S. Cl.
CPC .............. *B60K 17/08* (2013.01); *B60K 17/28* (2013.01); *F16H 3/46* (2013.01); *F16H 2200/0004* (2013.01); *F16H 2200/2007* (2013.01); *F16H 2200/2038* (2013.01)

(58) Field of Classification Search
CPC .............. F16H 3/62; F16H 2200/0004; F16H 2200/2038; F16H 2200/0021; F16H 2200/2007
See application file for complete search history.

(56) References Cited

U.S. PATENT DOCUMENTS

| | | | |
|---|---|---|---|
| 7,220,201 B2 | 5/2007 | Raghavan et al. | |
| 7,708,665 B2* | 5/2010 | Wheals | F16H 48/11 475/205 |
| 7,731,614 B2* | 6/2010 | Casey | B60K 1/00 475/18 |
| 9,005,071 B2* | 4/2015 | Smemo | B60K 17/08 475/271 |

* cited by examiner

*Primary Examiner* — Huan Le
(74) *Attorney, Agent, or Firm* — Vivacqua Crane PLLC

(57) ABSTRACT

A gearbox having a power take-off for an electrically propelled vehicle. The gearbox includes a housing; at least one planetary gear set; an input shaft in continuous connection with at least one sun gear; a first output shaft in continuous connection with a carrier; a second output shaft in continuous connection with a ring gear; and a plurality of brake clutches grounded to the housing and are selectively engageable in combinations to transfer a torque from the input shaft to at least one of the first output shaft and the second output shaft.

6 Claims, 5 Drawing Sheets

| Mode | 1-B1 | 1-B2 |
|---|---|---|
| 1 | X | O |
| 2 | O | X |
| 3 | O | X |

FIG. 4

| Mode | 2-B1, 3-B1 | 2-B2, 3-B2 | 2-B3, 3-B3 |
|---|---|---|---|
| 1 | X | O | O |
| 2 | O | O | X |
| 3 | O | O | X |
| 4 | O | X | O |
| 5 | O | X | O |

FIG. 5

ELECTRICALLY PROPELLED VEHICLE GEARBOX HAVING A POWER TAKE-OFF

INTRODUCTION

The present disclosure relates to a gearbox for an electrically propelled vehicle, and more particularly to an electrically propelled vehicle gearbox having a power take-off.

Electrically propelled vehicles including electric vehicles or hybrid vehicles that use an electric motor for propulsion. In a traditional electric vehicle, an electric motor is powered by an electrical energy storage device to propel the vehicle. In one version of a hybrid vehicle, an electric motor is powered by an electrical energy storage device to supplement the power produced by an internal combustion (IC) engine when required to propel the vehicle. In another version of a hybrid vehicle, an IC engine may be used to drive a generator that replenishes the electrical energy storage device that powers the electric motor to propel the vehicle. In these examples of electrically propelled vehicles, torque generated by the electric motors are routed through a gearbox, also referred to as a transmission, to propel the vehicles.

Gearboxes, such as multi-gear transmissions, having a power take-off (PTO) are known to be used in vehicles powered by IC engines. The PTO is used to transfer power generated by an IC engine to power an external device such as water pumps, a hydraulic pumps, winches, and the likes. Traditional transmissions for IC engines include a complex combinations of gears and clutches to accommodate the optimal operating ranges of the IC engine.

Thus, while traditional transmissions having power take-offs for vehicles having IC engines achieve their intended purpose, there is a need for a more elegant and simpler gearboxes having power take-offs for electrically propelled vehicles that take advantages of the wide torque curve of the electric motors without the unnecessary complexity as that of traditional transmissions for IC engines.

SUMMARY

According to several aspects, a gearbox having a power take-off for an electrically propelled vehicle is disclosed. The gearbox includes a housing; a planetary gear sets having a first sun gear, a second sun gear, a plurality of first planetary gears, a plurality of second planetary gears, a carrier holding the plurality of first planetary gears and plurality of second planetary gears, and a ring gear, wherein the plurality of first planetary gears are coupled between the ring gear and the first sun gear, and wherein the plurality of second planetary gears coupled between the plurality of first planetary gears and the second sun gear; an input shaft in continuous connection with the first sun gear; a first output shaft in continuous connection with the first carrier; a second output shaft in continuous connection with the first ring gear; a first brake clutch grounded to the housing and selectively engageable with the ring gear; a second brake clutch is grounded to the housing and selectively engageable with the second sun gear; and a third brake clutch is grounded to the housing and selectively engageable with the carrier.

In an additional aspect of the present disclosure, at least one of the first output shaft and the second output shaft is directly connected with the first carrier and the ring gear, respectively.

In another aspect of the present disclosure, both the first output shaft and the second output shaft is directly connected with the first carrier and the ring gear, respectively.

In another aspect of the present disclosure, at least one of the first output shaft and the second output shaft is indirectly connected with the first carrier and the ring gear, respectively, by a gear set.

In another aspect of the present disclosure, the first brake clutch, the second brake clutch, and the third brake clutch are selectively engageable in combinations to transfer a torque from the input shaft to one of the first output shaft and the second output shaft.

In another aspect of the present disclosure, the first brake clutch, the second brake clutch, and the third brake clutch are selectively engageable in combinations to lock the first output shaft.

In another aspect of the present disclosure, the first brake clutch, the second brake clutch, and the third brake clutch are selectively engageable in combinations to transfer a torque to both the first output shaft and the second output shaft.

According to several aspects, a gearbox having a power take-off for an electrically propelled vehicle is disclosed. The gearbox includes a housing; a first planetary gear sets having a first sun gear, a plurality of first planetary gears, a first carrier holding the plurality of first planetary gears, and a first ring gear, wherein the plurality of first planetary gears are coupled to the first sun gear and the first ring gear; a second planetary gear sets having a second sun gear, a plurality of second planetary gears, a second carrier holding the plurality of second planetary gears, and a second ring gear, wherein the plurality of second planetary gears are coupled to the second sun gear and the second ring gear; an input shaft in continuous connection with the first sun gear and the second sun gear; a first output shaft in continuous connection with the first carrier; a second output shaft in continuous connection with the first ring gear; a first brake clutch grounded to the housing and selectively engageable with the first ring gear; a second brake clutch is grounded to the housing and selectively engageable with the second ring gear; and a third brake clutch is grounded to the housing and selectively engageable with the first carrier.

In an additional aspect of the present disclosure, a torque is transferred from the input shaft to the first output shaft when the first brake clutch is a closed position, the second brake clutch is in an open position, and the third brake clutch is in an open position.

In another aspect of the present disclosure, a torque is transferred from the input shaft to the second output shaft when the first brake clutch is an open position, the second brake clutch is in an open position, and the third brake clutch is in a closed position.

In another aspect of the present disclosure, the first output shaft is in a locked position and a torque is not transferred from the output shaft to the second output shaft when first brake clutch is an open position, the second brake clutch is in an open position, and the third brake clutch is in a closed position.

In another aspect of the present disclosure, a torque is transferred from the input shaft to both the first output shaft and the second output shaft when the first brake clutch is an open position, the second brake clutch is in a closed position, and the third brake clutch is in an open position.

In another aspect of the present disclosure, the first brake clutch, the second brake clutch, and the third brake clutch are selectively engageable in combinations to transfer a torque from the input shaft to at least one of the first output shaft and the second output shaft.

According to several aspects, a gearbox having a power take-off for an electrically propelled vehicle is disclosed. The gearbox includes a housing; a first planetary gear sets having a first element, a second element, and a third element; an input shaft in continuous connection with the first element; a first output shaft in continuous connection with the second element; a second output shaft in continuous connection with the third element; a first brake clutch grounded to the housing and selectively engageable with the third element; and a second brake clutch grounded to the housing and selectively engageable with the second element.

In an additional aspect of the present disclosure, the first element is a sun gear, the third element is the ring gear, and the second element is a carrier holding a plurality of planet gears coupled to the sun gear and the ring gear.

In another aspect of the present disclosure, the input shaft is adapted to receive a torque from an electric motor, the first output shaft is adapted to transfer the torque to a drive unit, and the second output shaft is adapted to transfer the torque to an external device.

In another aspect of the present disclosure, the first brake clutch and the second brake clutch are selectively engageable in combinations to transfer a torque from the input shaft to one of the first output shaft and the second output shaft.

In another aspect of the present disclosure, a torque is transferred from the input shaft to the first output shaft when the first brake clutch is in an engaged position with the ring gear and the second brake clutch is in a disengaged relationship with the carrier.

In another aspect of the present disclosure, a torque is transferred from the input shaft to the second output shaft when the second brake clutch is in an engaged position with the carrier and the first brake clutch is in a disengaged relationship with the ring gear.

In another aspect of the present disclosure, at least one of the first brake clutch and the second brake clutch comprises a friction brake clutch.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a truth table illustrating alternative states of engagement of the various torque transmitting elements in the first embodiment of the gearbox having a power take-off if FIG. 1A;

FIG. 5 is a truth table illustrating alternative states of engagement of the various torque transmitting elements for the second and third embodiments of the gearbox having a power take-off of FIGS. 2A and 3A.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1A:
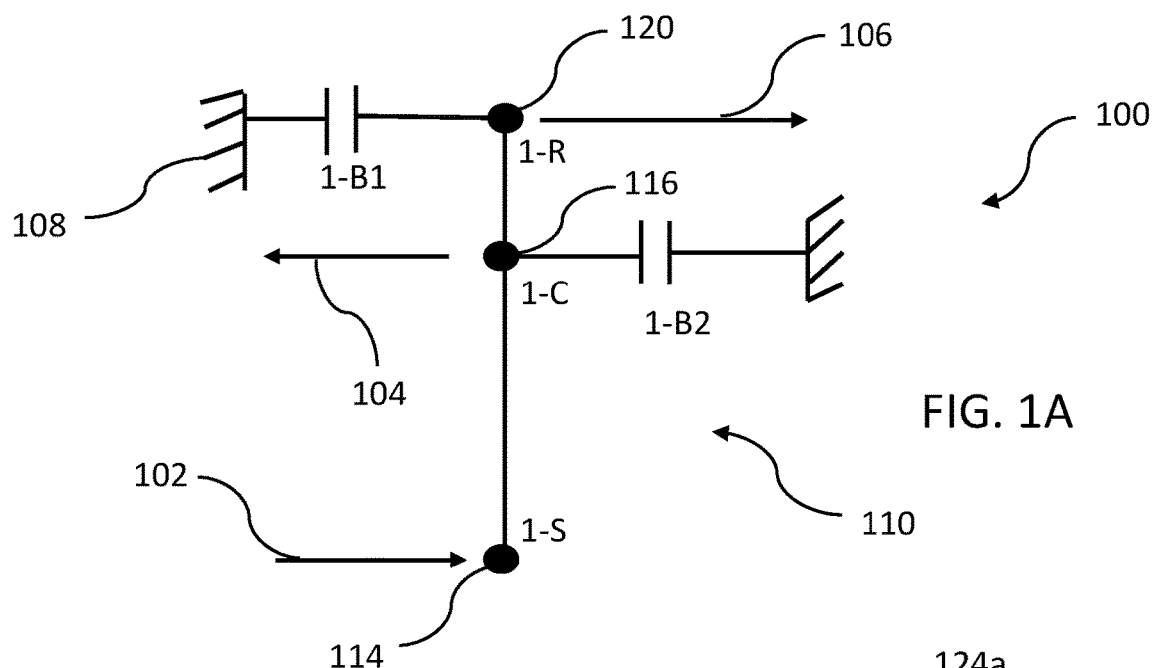
FIG. 1A is a lever diagram of a first embodiment of an electrically propelled vehicle gearbox having a power take-off, according to an exemplary embodiment.
Figure 2A:
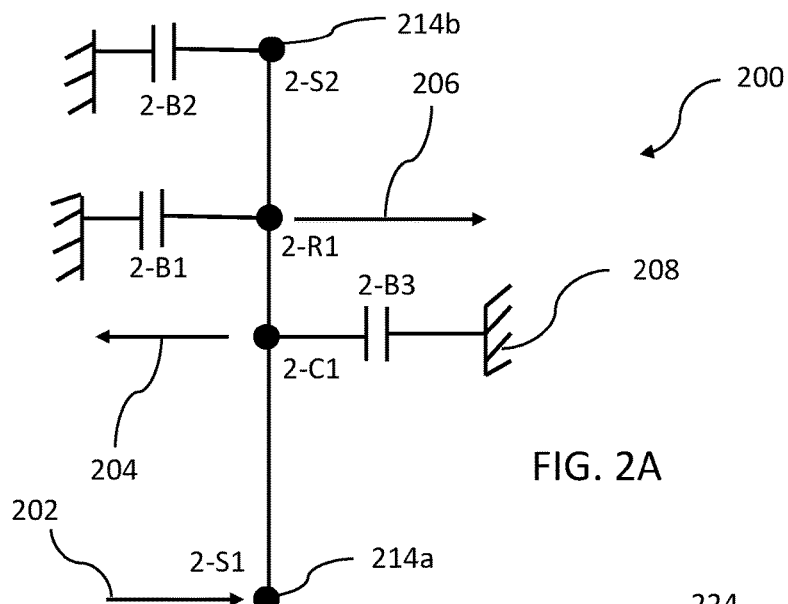
FIG. 2A is a lever diagram of a second embodiment of an electrically propelled vehicle gearbox having a power take-off, according to an exemplary embodiment.
Figure 3A:
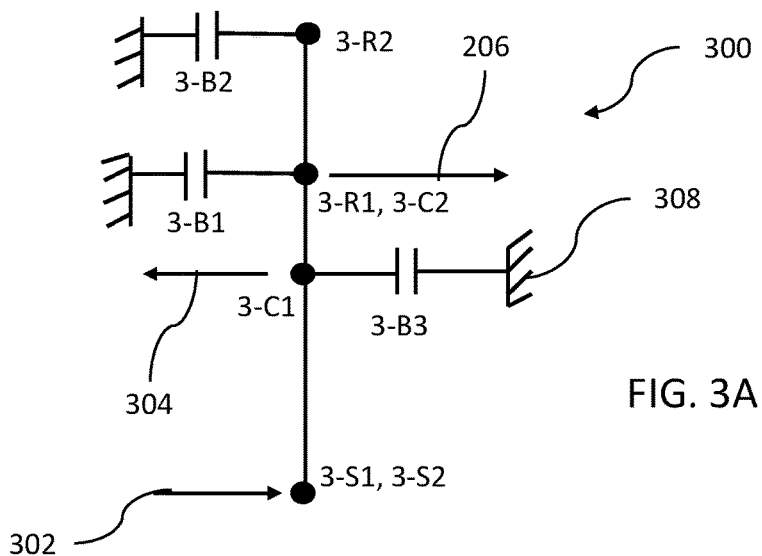
FIG. 3A is a lever diagram of a third embodiment of an electrically propelled vehicle gearbox having a power take-off, according to an exemplary embodiment.

Three alternative embodiments of an electrically propelled vehicle gearbox having a power take-off are represented by lever diagrams shown in FIGS. 1A, 2A, and 3A. The gearbox may be that of a transmission for the electrically propelled vehicle. A lever diagram is a schematic representation of the components of a mechanical device such, as a transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

Figure 1B:
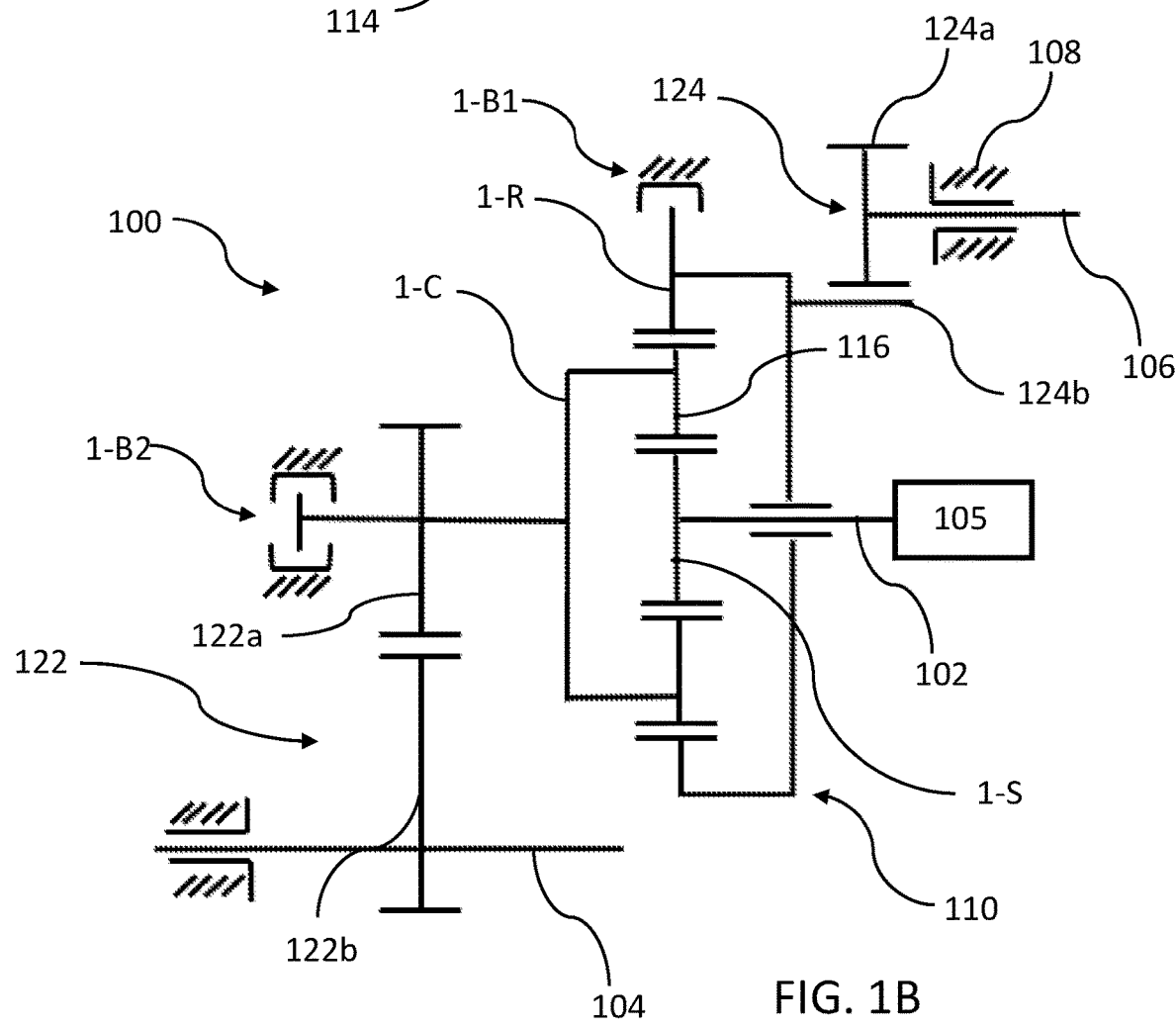
FIG. 1B a diagrammatic illustration of the first embodiment of the gearbox having a power take-off of FIG. 1A.
Figure 2B:
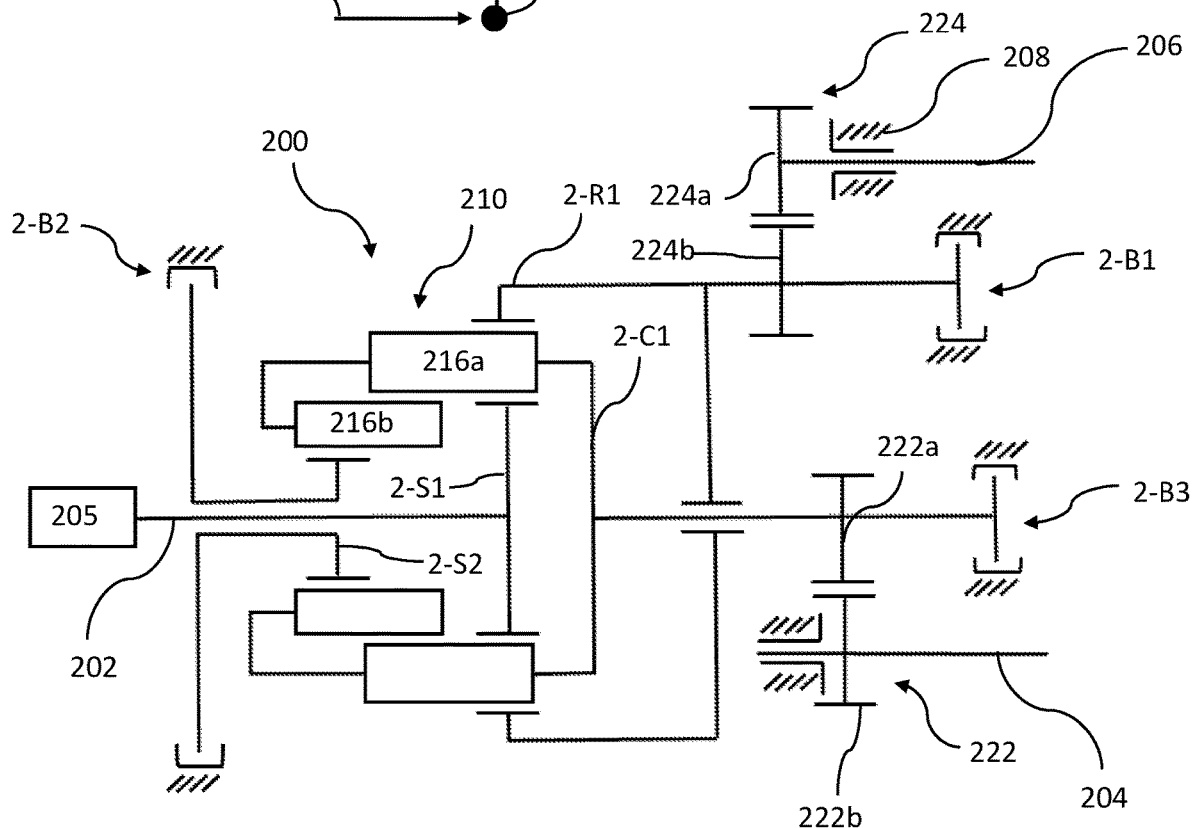
FIG. 2B is diagrammatic illustration of the second embodiment of the gearbox having a power take-off of FIG. 2A.
Figure 3B:
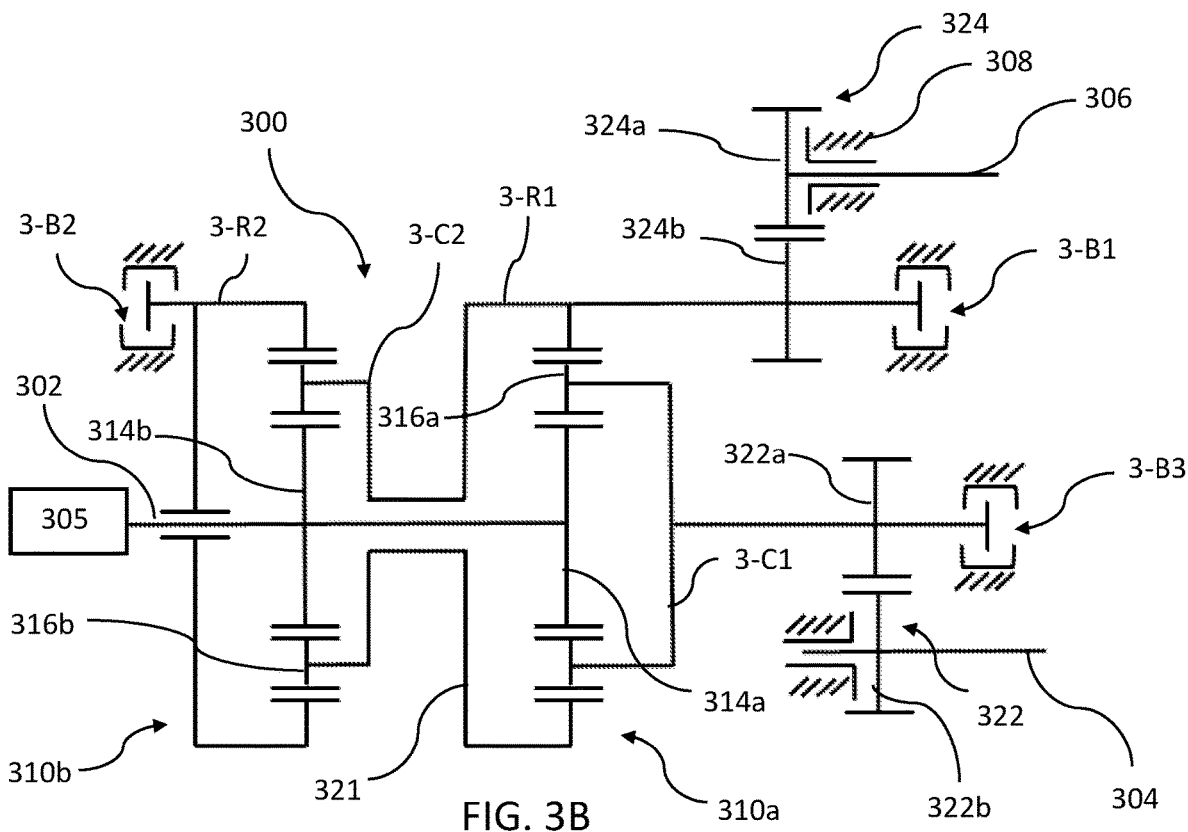
FIG. 3B is a diagrammatic illustration of the third embodiment of the gearbox having a power take-off of FIG. 3A.

For clarity of detailed description, the three alternative embodiments of the gearbox having a power take-off are also shown as diagrammatic illustrations in FIGS. 1B, 2B, and 3B. A fourth manually operated embodiment of the gearbox having a power take-off is shown as a diagrammatic illustration in FIG. 6. Unless otherwise stated in the description below, the lines connecting the different components refer to or indicate paths through which torque is transferred. In addition, unless otherwise stated in the description below, the broken lines (e.g., "=" and "||") refer to the coupling of two or more components (e.g., gears, splines, clutch, brakes, etc.) to one another.

Referring to FIGS. 1A and 1B, a first embodiment of a gearbox having a power take-off 100, also referred to as PTO 100 for brevity, for an electrically propelled vehicle (not shown) is presented. The PTO 100 includes an input shaft 102, a first output shaft 104, and a second output shaft 106. The input shaft 102, is adapted to receive a torque from an electric motor 105. The first output shaft 104, also referred to as a drive shaft 104, is adapted to deliver a torque to a final drive unit (not shown), such as a differential, of the electrically propelled vehicle. The second output shaft 106, also referred to as a PTO shaft 106 or an accessory output shaft 106, is adapted to deliver a torque to an external device (not shown). In the embodiment shown, the input shaft 102, first output shaft 104, and the second output shaft 106 are not axially aligned.

The PTO 100 includes a housing 108 containing a planetary gear set 110 and a plurality of clutches in selective engagement with elements of the planetary gear set 110 for transferring torque from the input shaft 102 to either the first output shaft 104 of the second output shaft 106.

The elements of the planetary gear set 110 includes a sun gear 1-S, a plurality of planet gears 116, a carrier 1-C holding the plurality of planet gears 116, and a ring gear 1-R. The plurality of planet gears 116 are coupled to the sun gear 1-S and the ring gear 1-R. The input shaft 102 is in continuous connection with the sun gear 1-S. The first output shaft 104 may be in direct continuous connection with the carrier 1-C for common rotation with the carrier 1-C or may be in indirect continuous connection with the carrier by way of a first gear set 122 for reduced or increased ratio rotation with the carrier 1-C. The second output shaft 106 may be in direct continuous connection with the ring gear 1-R for common rotation with the ring gear 1-R or may be in indirect continuous connection by way of a second gear set 124 for a reduced or increased ratio rotation with the ring gear 1-R. The first and second gear sets each may include a first gear 122a, 124a meshed to a second gear 122b, 124b. The sun gear 1-S may be referred to as a first element, the carrier 1-C referred to as a second element, and the ring gear 1-R as a third element of the planetary gear set 110

The plurality of clutches includes a first brake clutch 1-B1 and a second brake clutch 1-B2, which are also known as a first and second reaction clutches 1-B1, 1-B2, respectively. The first brake clutch 1-B1 is grounded to a stationary object such as that of the housing 108 and is selectively engageable with the ring gear 1-R to hold the ring gear 1-R stationary with respect to the housing 108. The second brake clutch 1-B2 is grounded to a stationary object such as that of the housing 108 and is selectively engageable with the carrier 1-C to hold the carrier 1-C stationary with respect to the housing 108. The plurality of clutches may be that of a friction clutch, dog clutch, or the likes.

Shown in FIG. 4 is a truth table illustrating the state of engagement of the first and second brake clutches 1-B1, and 1-B2 and the resulting operating mode of the PTO 100. An "X" in the box means that the particular referenced brake is engaged, or closed. An "O" means that the particular referenced brake is disengaged, or opened. The first brake clutch 1-B1 and second brake clutch 1-B2 are selectively engaged and disengaged to achieve a specific operating mode.

Referring to both FIGS. 4, 1A, and 1B, in a first operating mode, the first brake clutch is closed to hold the ring gear 1-R stationary and the second brake clutch is opened, thus allowing torque to be transferred from the input shaft 102 to the first output shaft 104, also referred to as the drive shaft, to propel the vehicle. The gearing ratio between the sun gear 1-S and the carrier 1-C doubles up as a transfer gear.

In a second operating mode, the second brake clutch is closed to hold the carrier stationary and the first brake clutch is opened to allow torque transfer from the input shaft 102 to the second output shaft 106, also referred to as the accessory shaft, to power an external device. In the second operating mode, the engagement of the second brake clutch also acts as a parking pawl by preventing the rotation of the carrier which is continuously connected to the drive shaft.

Referring to FIGS. 2A and 2B is a second embodiment of a gearbox having a power take-off 200, also referred to as PTO 200, for an electrically propelled vehicle is presented. The PTO 200 includes an input shaft 202, a first output shaft 204, and a second output shaft 206. The input shaft 202, is adapted to receive a torque from an electric motor 205. The first output shaft, or drive shaft, is adapted to deliver a torque to a component of a drive train, such as a differential (not shown), of the electrically propelled vehicle. The second output shaft 206, also referred to as a PTO shaft 206 or an accessory output shaft 206, is adapted to deliver a torque to an external device (not shown). In the embodiment shown, the input shaft 202, first output shaft 204, and the second output shaft 206 are not axially aligned.

The PTO 200 includes a housing 208 containing a double planetary gear set 210, also referred to as a Ravigneaux planetary gear set, and a plurality of clutches in selective engagement with elements of the planetary gear set 210 for transferring torque from the input shaft to either the first output shaft and/or the second output shaft.

The elements of the double planetary gear set 210 includes a first sun gear 2-S1, a second sun gear 2-S2, a plurality of first planet gears 216a, a plurality of second planet gears 216b, a carrier 2-C1, and a ring gear 2-R1. The carrier 2-C1 holds the plurality of first plant gears 216a, also referred to as outer planet gears 216a, and the plurality of second plant gears 216b, also referred to as inner planet gears 216b. The inner planet gears 216b are coupled to the second sun gear 2-S2 and to the outer planet gears 216a. The outer planet gears 216a are also coupled to the first sun gear 2-S1 and the ring gear 2-R1.

The input shaft 202 is in continuous connection with the first sun gear 2-S1. The first output shaft 204 may be in direct continuous connection with the carrier 2-C1 for common rotation with the carrier 2-C1 or may be in indirect continuous connection with the carrier 2-C1 by way of a first gear set 222 for reduced or increased gear ratio rotation with the carrier 2-C1. The second output shaft 206 may be in direct continuous connection with the ring gear 2-R1 for common rotation with the ring gear 2-R1 or may be in indirect continuous connection by way of a second gear set 224 for a reduced or increased gear ratio rotation with the ring gear 2-R1. The first and second gear sets 222, 224 may each include a first gear 222a, 224a meshed to a second gear 222b, 224b.

The plurality of clutches includes a first brake clutch 2-B1, a second brake clutch 2-B2, and a third brake clutch 2-B3, which are also known as a first, second, and third reaction clutches 2-B1, 2-B2, 2-B3, respectively. The plurality of clutches may be that of a friction clutch, dog clutch, or the likes. The first brake clutch 2-B1 is grounded to a stationary object such as that of the housing 208 and is selectively engageable with the ring gear 2-R1 to hold the ring gear stationary with respect to the housing 208. The second brake clutch 2-B2 is grounded to a stationary object such as that of the housing 208 and is selectively engageable with the second sun gear 2-S2 to hold the second sun gear 2-S2 stationary with respect to the housing 208. The third brake clutch 2-B3 is grounded to a stationary object such as that of the housing 208 and is selectively engageable with the carrier 2-C1 to hold the carrier 2-C1 stationary with respect to the housing 208.

Referring to FIGS. 3A and 3B is a third embodiment of a gearbox having a power take-off 300, also referred to as PTO 300, for an electrically propelled vehicle is presented. The PTO 300 includes an input shaft 302, a first output shaft 304, and a second output shaft 306. The input shaft 302, is adapted to receive a torque from an electric motor 305. The first output shaft 304 is adapted to deliver a torque to a final drive unit (not shown), such as a differential, of the electrically propelled vehicle. The second output shaft 306, also referred to as a PTO output shaft 306 or an accessory output shaft 306, is adapted to deliver a torque to an external device (not shown). In the embodiment shown, the input shaft 302, first output shaft 304, and the second output shaft 306 are not axially aligned.

The PTO 300 includes a housing 308 containing a first planetary gear set 310a, a second planetary gear set 310b, and a plurality of clutches in selective engagement with elements of the first planetary gear set 310a and second first planetary gear set 310b for transferring torque from the input shaft 302 to either the first output shaft 304 or the second output shaft 306.

The elements of the first planetary gear set 310a includes a first sun gear 314a, a plurality of first planet gears 316a, a first carrier 3-C1 holding the plurality of first planet gears 316a, and a first ring gear 3-R1. The plurality of first planet gears 316a are coupled to the first sun gear 314a the first ring gear 3-R1. Similarly, the elements of the second planetary gear set 310b includes a second sun gear 314b, a plurality of second planet gears 316b, a second carrier 3-C2 holding the plurality of second planet gears 316b, and a second ring gear 3-R2. The plurality of second planet gears 316b are coupled to the second sun gear 314b the second ring gear 3-R2. The first ring gear 3-R1 is in continuous connection with the second carrier 3-C2 by an interconnecting member 321.

The input shaft 302 is in continuous connection with the first sun gear 314a and second sun gear 314b for common rotation with the first sun gear 314a and the second sun gear 314b. The first output shaft 304 may be in direct continuous connection with the first carrier 3-C1 for common rotation with the first carrier 3-C1 or may be in indirect continuous connection with the first carrier 3-C1 by way of a first gear set 322a. The second output shaft 306 may be direct continuous connection with the first ring gear 3-R1 or may be in indirectly continuous connection by way of a second gear set 324. The first and second gear sets 322, 324 each may include a first gear meshed to a second gear.

The plurality of clutches includes a first brake clutch 3-B1, a second brake clutch 3-B2, and a third brake clutch 3-B3, which are also known as reaction clutches. The first brake clutch 3-B1 is grounded to a stationary object such as that of the housing 308 and is selectively engageable to the first ring gear 3-R1 to hold the first ring gear 3-R1 stationary with respect to the housing 308. The second brake clutch 3-B2 is grounded to a stationary object such as that of the housing 308 and is selectively engageable with the second ring gear 3-R2 to hold the second ring gear 3-R2 stationary with respect to the housing 308. The third brake clutch 3-B3 is grounded to a stationary object such as that of the housing 308 and is selectively engageable with the first carrier 3-C1 to hold the first carrier 3-C1 stationary with respect to the housing 308. The first brake clutch 3-B1, the second brake clutch 3-B2, and the third brake clutch 3-B3 may be that of the friction plate type clutch variety.

Referring to FIG. 5, the truth table illustrating the state of engagement of the various brake clutches and the resulting operating mode of the PTO 200 and PTO 300. An "X" in the box means that the particular referenced brake is engaged, or closed. An "O" means that the particular referenced brake is disengaged, or opened. The first brake clutch 2-B1, 3-B1, the second brake clutch 2-B2, 3-B2, and the third brake clutch 2-B3, 3-B3, with respect to each of PTO 200 and PTO 300, are selectively engaged and disengaged to achieve a specific operating mode.

Referring to FIGS. 5, 2A, 2B, 3A, and 3B, in a first operating mode, the first brake clutch 2-B1, 3-B1, is closed, the second brake clutch 2-B2, 3-B2 is open, and the third brake clutch is open, thus allowing torque flow to the first output shaft. In the first operating mode the ratio between the sun gear and carrier doubles up as a transfer gear to drive the vehicle in first gear.

In a second operating mode, the first brake clutch 2-B1, 3-B1 is open, the second brake clutch is open 2-B2, 3-B2, and the third brake 2-B3, 3-B3 clutch is closed, thus allowing torque flow to the second output shaft. In this mode, the motor can drive the accessory feed only, when the vehicle is at a stop or locked in park.

In a third operating mode, the first brake clutch 2-B1, 3-B1 is open, the second brake clutch 2-B2, 3-B2 is open, the third brake clutch 2-B3,3-B3 is closed is closed, thus locking the vehicle in park, but with no load on the accessory shaft.

In a fourth operating mode, the first brake clutch 2-B1, 3-B1 is open, the second brake clutch 2-B2, 3-B2 is closed, the third brake clutch 2-B3, 3-B3 is open, thus torque is transferred to both the first output shaft and to the second output shaft. In the fourth operating mode, the vehicle is in second gear and transferring torque to the accessory load at the same time In a fifth operating mode, the first brake clutch 2-B1, 3-B1 is open, the second brake clutch 2-B2, 3-B2 is closed, the third brake clutch 2-B3,3-B3 open, transferring torque to the first output shaft but with no load on the accessory shaft. In the fifth operating mode, the vehicle is in a second gear.

Figure 6:
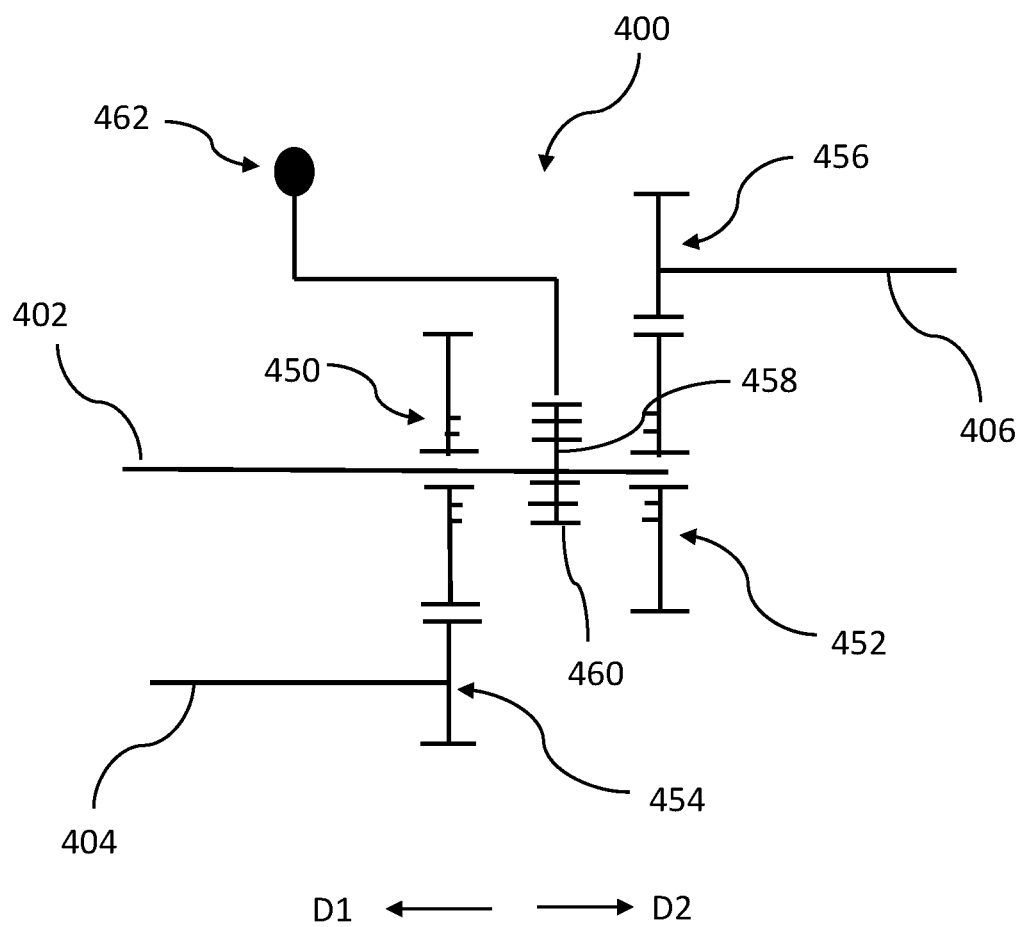
FIG. 6 is a diagrammatic illustration of a fourth embodiment of an electrically propelled vehicle gearbox having a power take-off, according to an exemplary embodiment.

Referring to FIG. 6, a fourth embodiment of a gearbox having a power take-off 400, also referred to as PTO 400, for an electrically propelled vehicle is presented. The PTO 400 is manually operated for selectively transferring torque from an input shaft 402 to a first output shaft 404, also referred to as a drive shaft 404, and a second output shaft 406, also referred to as an accessory shaft 406. The input shaft 402 includes a first gear 450 rotatably mounted on the input shaft 402, such that the first gear 450 rotates independent of the rotation of the input shaft 402. A second gear 452 is rotatably mounted on the input shaft 402, such that the second gear 452 rotates independent of the rotation of the input shaft 402. The first gear 450 is continuous mesh with a first output gear 454 and the second gear 452 is continuous mesh with a second output gear 456. The first output gear 454 is fixed onto the first output shaft 404, such that the first output gear 454 rotates with the first output shaft 404. The second output gear 456 is fixed onto the second output shaft 406, such that the second output gear 456 rotates with the second output shaft 406.

A hub 458 is fixed onto the input shaft 402 between the first and second gears, such that the hub 458 rotates with the input shaft 402. A slideable sleeve 460 is fixed onto the hub 458, such that the slideable sleeve 460 rotates with hub 458. The sleeve 460 is slideable in a first direction on the hub 458 to engage the first gear 450, thereby transferring torque from the input shaft 402 to the first output shaft 404. The sleeve 460 is also slideable in a second direction D2, opposite the first direction D1, to engage the second gear 452, thereby transferring torque from the input shaft 402 to the second output shaft 406. A shift lever 462 is provided for manually selectively sliding the sleeve 460 in the first direction D1 and the second direction D2.

The detailed description disclosed two exemplary embodiments of a 4-node lever gearbox having a power take-off for an electrically propelled vehicle. It should be appreciated that in view of the disclosure, multiple realizations of a 4-node lever gearbox are possible, and only two of the several possible combinations have been shown in the disclosure. The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A gearbox having a power take-off for an electrically propelled vehicle, comprising:
    a housing;
    a first planetary gear set having a first sun gear, a plurality of first planetary gears, a first carrier holding the plurality of first planetary gears, and a first ring gear, wherein the plurality of first planetary gears are coupled to the first sun gear and the first ring gear;
    a second planetary gear set having a second sun gear, a plurality of second planetary gears, a second carrier holding the plurality of second planetary gears, and a second ring gear, wherein the plurality of second planetary gears are coupled to the second sun gear and the second ring gear;
    an input shaft in continuous connection with the first sun gear and the second sun gear;
    a first output shaft in continuous connection with the first carrier;
    a second output shaft in continuous connection with the first ring gear;
    a first brake clutch grounded to the housing and selectively engageable with the first ring gear;
    a second brake clutch is grounded to the housing and selectively engageable with the second ring gear; and
    a third brake clutch is grounded to the housing and selectively engageable with the first carrier.

2. The gearbox of claim 1, wherein a torque is transferred from the input shaft to the first output shaft when the first brake clutch is a closed position, the second brake clutch is in an open position, and the third brake clutch is in an open position.

3. The gearbox of claim 1, wherein a torque is transferred from the input shaft to the second output shaft when the first brake clutch is an open position, the second brake clutch is in an open position, and the third brake clutch is in a closed position.

4. The gearbox of claim 1, wherein the first output shaft is in a locked position and a torque is not transferred from the input shaft to the second output shaft when first brake clutch is an open position, the second brake clutch is in an open position, and the third brake clutch is in a closed position.

5. The gearbox of claim 1, wherein a torque is transferred from the input shaft to both the first output shaft and the second output shaft when the first brake clutch is an open position, the second brake clutch is in a closed position, and the third brake clutch is in an open position.

6. The gearbox of claim 1, wherein the first brake clutch, the second brake clutch, and the third brake clutch are selectively engageable in combinations to transfer a torque from the input shaft to at least one of the first output shaft and the second output shaft.

* * * * *